No. 649,033. Patented May 8, 1900.
O. H. ADAMS.
STOP FOR SELF BINDERS.
(Application filed June 7, 1899.)
(No Model.)
Fig. 1.
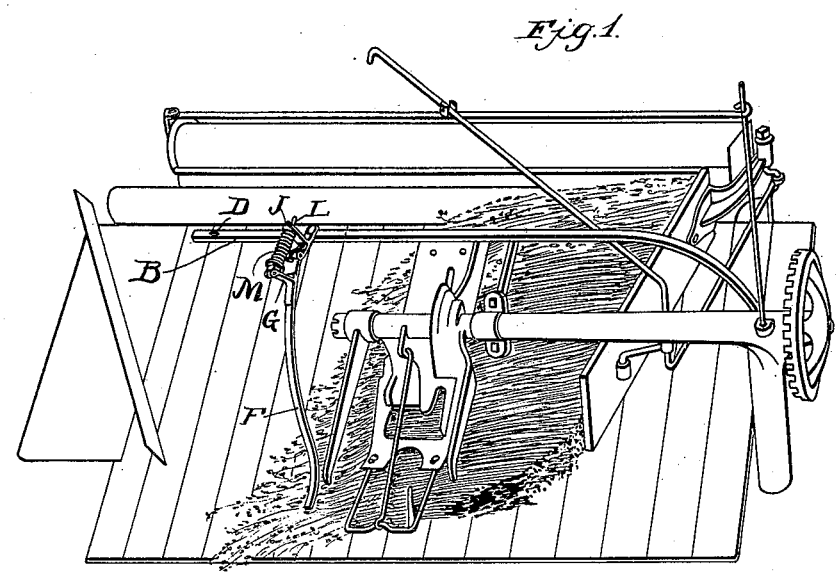
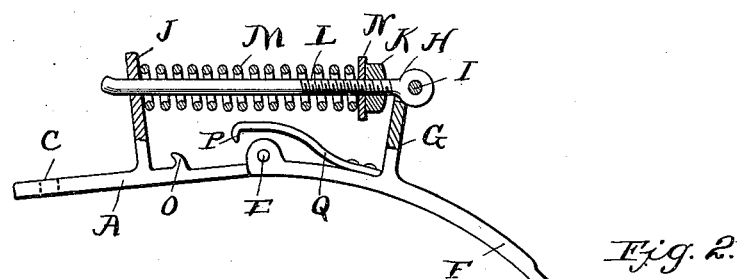
Fig. 2.
Witnesses
E. C. Wurdeman
S. S. Williamson
Inventor
Oscar H. Adams
by Geo. C. Hazelton
Atty
THE NORRIS PETERS CO., PHOTO-LITHO., WASHINGTON, D. C.

United States Patent Office.

OSCAR H. ADAMS, OF KEOKUK, IOWA.

STOP FOR SELF-BINDERS.

SPECIFICATION forming part of Letters Patent No. 649,033, dated May 8, 1900.

Application filed June 7, 1899. Serial No. 719,639. (No model.)

*To all whom it may concern:*

Be it known that I, OSCAR H. ADAMS, a citizen of the United States, residing at Keokuk, in the county of Lee and State of Iowa, have invented a certain new and useful Improvement in Stops for Self-Binders, of which the following is a specification.

My invention relates to a new and useful improvement in stops for self-binders, and has for one object to provide a simple and effective arrangement whereby the stop-arms or fingers may be given any desired tension and which may be adjusted and varied to suit the requirements of the particular work being performed.

A further object of my invention is to provide an effective means whereby the stop-fingers are thrown out of action by simply swinging them upward against the action of their springs.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a perspective of a portion of a self-binder, showing one of my adjustable grain-stop fingers attached thereto; and Fig. 2, an enlarged view of one of these fingers, showing the manner of adjusting the tension of the spring.

In carrying out my invention as here embodied I provide a bracket A, which is adapted to be secured to a strip B, carried by the self-binder, in any suitable manner—as, for instance, by a bolt or screw passing through a hole C in the bracket and a corresponding hole D in the strip. This bracket has hinged thereto at E the stop-finger F, which is of proper shape to hold the bundle that the ends may not drop and waste the grain, and with this finger is formed an offset G, to which is pivoted the rod H at I. The opposite end of the rod passes through a suitable hole in the offset J, formed with the bracket, and a nut K is run upon the threads L, formed upon the rod, and a spring M is coiled about the rod between the nut and the offset J, so as to give the finger F a tendency to swing downward, which tendency will be increased or decreased by the proper adjustment of the nut K. A suitable washer N being interposed between the nut and the spring is found desirable.

A lug O is formed upon the bracket, with which the hooked end P of the latch-spring Q is adapted to engage, so that when it is desirable to throw the finger out of use it may be swung upward until this catch-spring engages the lug, where it will be held until said spring is released.

It is obvious from this description that any desirable tension may be put upon the stop-fingers, so as to handle the heaviest grain in the most advantageous manner, whereas this has not been true in connection with stop-springs heretofore used, since there was no adjustment provided for and the tension of the spring could not be altered and lay largely in the finger itself.

Of course I do not wish to be limited to the exact details of construction here shown, as these may be varied without departing from the spirit of my invention, the gist of which rests in the broad idea of providing a hinged stop-finger which is actuated by a suitable spring, the tension of which is capable of adjustment.

Having thus fully described my invention, what I claim as new and useful is—

In combination, a suitable bracket, a stop-finger hinged thereto, an offset projecting from said finger, a corresponding offset projecting from the bracket, a rod pivoted to the first-named offset, a nut threaded upon the rod, a spring interposed between said nut and the bracket-offset, a catch-spring carried by the finger, and a lug formed with the bracket with which said catch-spring is adapted to engage for holding the finger out of action, as specified.

In testimony whereof I have hereunto affixed my signature in the presence of two subscribing witnesses.

OSCAR H. ADAMS.

Witnesses:
W. H. BOWMAN,
THOS. CONROY.